United States Patent [19]
Dispenza

[11] Patent Number: 6,079,920
[45] Date of Patent: Jun. 27, 2000

[54] CAPTIVE FASTENER

[75] Inventor: John Anthony Dispenza, Long Valley, N.J.

[73] Assignee: Lucent Technologies Inc., Murray Hill, N.J.

[21] Appl. No.: 09/247,678

[22] Filed: Feb. 9, 1999

[51] Int. Cl.⁷ .............................. F16B 37/04; F16B 39/00
[52] U.S. Cl. ..................... 411/107; 411/171; 411/180; 411/999
[58] Field of Search ...................... 411/107, 111, 411/112, 113, 180, 171, 510, 970, 999

[56] References Cited

U.S. PATENT DOCUMENTS

| | | |
|---|---|---|
| D. 262,862 | 2/1982 | Barnsdale ........................ D8/8 |
| 1,409,606 | 3/1922 | Stendahl . |
| 1,788,408 | 1/1931 | Raybould . |
| 1,927,780 | 9/1933 | Anderson ........................ 220/24 |
| 2,761,484 | 9/1956 | Sternick et al. . |
| 3,124,189 | 3/1964 | Dietlein . |
| 3,126,935 | 3/1964 | Tuozzo . |
| 3,156,281 | 11/1964 | Greenburg . |
| 3,218,906 | 11/1965 | Dupree . |
| 3,250,559 | 5/1966 | Sommerfeld ........................ 292/251 |
| 3,560,132 | 2/1971 | Gulistan . |
| 3,571,904 | 3/1971 | Gullstan ........................ 29/33 |
| 4,046,181 | 9/1977 | Barnsdale . |
| 4,486,134 | 12/1984 | White ........................ 411/107 X |
| 4,621,961 | 11/1986 | Gulistan . |
| 4,842,462 | 6/1989 | Tildesley ........................ 411/180 |
| 4,921,382 | 5/1990 | Fries et al. ........................ 411/107 X |
| 5,468,109 | 11/1995 | Ferrari et al. ........................ 411/180 X |
| 5,489,176 | 2/1996 | Fulz . |

*Primary Examiner*—Neill Wilson

[57] ABSTRACT

A captive fastener assembly for non-releasable securement to a subassembly formed at least in part of a soft, ductile material and for operatively connecting such subassemblies to other members. A retainer cup has a set of projecting undercuts on its sidewall for grasping the ductile material of the subassembly through welding to prevent the captive fastener from being pulled out or away from the subassembly. A fastener member is journalled through an opening in the retainer cup to secure the subassembly to the other member, thereby forming an integral structure that resists loosening or falling apart. The captive fasteners of the present invention are simple and economical to manufacture and greatly increase the structural integrity and safety of structures that utilize them.

7 Claims, 2 Drawing Sheets

CAPTIVE FASTENER

BACKGROUND OF THE INVENTION

1. Field of the Invention

This invention relates generally to retainer cups for captive screw assemblies that are used to secure together parts or subassemblies. More particularly, the invention is directed to captive screw assemblies for securing a subassembly having at least a ductile portion to another part, subassembly, or member, and that resist disengagement from the subassembly when placed under stress.

2. Description of the Related Art

In the electronics and other industries, it is often desirable to secure with fasteners various subassemblies to parts, frames, members, or other subassemblies so as to form an integrated structure that may then be placed under, or be subjected to, stress. The stress tends to force the fasteners to separate from the subassemblies, thereby weakening the entire structure. In such situations, the fastener may become entirely detached from the subassembly and structure and fall out, thereby rendering the structure unstable, misaligned, or entirely disassembled. This will inevitably cause a decrease in performance of the entire system in which the structure is integrated, or may cause a complete failure of the system. Furthermore, in commercial or consumer settings, children may find the loose fasteners and inappropriately play with them by, for example, placing the fasteners in their mouths, presenting a potential choking hazard.

This problem has been at least partially addressed in the metal fabrication industry with various kinds of captive fasteners for holding metal objects to one another or to various other devices or frame members. In the building arts, various and sundry capturing mechanisms, such as anchors and rawls, have long been employed to secure fasteners in wallboard and wood panels, for example, so that structures constructed of these members will maintain composite integrity. However, in all other areas that employ plastic subassemblies and/or structures formed at least partially of softer and more ductile materials, a suitable captive fastener has not been developed that will securely seat in the subassemblies and remain permanently affixed thereto when stresses are applied to the resulting structures. Accordingly, at the present time structures of this nature tend to loosen and fall apart under stress and/or over time, causing degradation of the systems employing these subassemblies. For example, in the electronics industry, circuit packs, which generally comprise ductile plastics, often lose screws and fasteners intended to hold multiple circuit packs together or to their modular frames. This degrades circuit performance and often results in circuit and system failures.

There is thus a long-felt, unfulfilled need in the art for captive fastener assemblies for use in securing devices, parts, or subassemblies formed at least in part of soft, ductile materials to one another and/or to other devices or elements so as to form useful integrated or composite structures and assemblies.

SUMMARY OF THE INVENTION

The aforementioned long-felt needs are met, and problems solved, by captive fastener assemblies in accordance with the invention for securing subassemblies formed at least in part of soft, ductile materials to other members and which resist separation from the subassembly when stresses are placed thereon. The captive fastener assemblies preferably comprise a retainer cup for securely and non-releasably engaging the soft, ductile material of the subassembly and which is operatively welded to the soft, ductile material of the subassembly so that, when so welded to the subassembly, the retainer cup will be affixed thereto and will resist separation or disengagement from the subassembly under externally applied stress. More preferably, the captive fastener assemblies comprise a set of undercuts on a surface of the retainer cup for engagement with the subassembly during welding to retain the retainer cup to the subassembly. Even more preferably, the captive fasteners further comprise a fastener having a fastener head engaged with the retainer cup for securing the subassemblies to the other members.

Retainer cups for captive screw assemblies, useful for securing subassemblies formed at least in part of ductile, flowable materials to other members, and which can be welded to such a subassembly, also satisfy the above-mentioned long felt needs. The inventive retainer cup preferably comprises a substantially cylindrical base section having a cylindrical height and defining a cavity open at one end for receiving a fastening member therein. More preferably, the retainer cup comprises a substantially conical crimp button formed on a bottom portion of the cylindrical base section for retaining a fastener head of the fastener member within the retainer cup when the crimp button is deformed against the fastener head after the fastener member has been placed in the cavity. Still more preferably, a set of undercuts or projections is formed on an outside surface of the cylindrical base section for engaging the ductile material of the subassembly when the retainer cup is welded thereto and the flowable material of the subassembly flows in contact with and about the resulting interstices of the undercuts, thereby non-releasably capturing the retainer cup to the subassembly and keeping the retainer cup from separating from the subassembly as the fastening member operatively secures the subassembly to the other member.

The retainer cups and captive fastener assemblies in accordance with the present invention for use in and with subassemblies formed at least in part of ductile materials thus provide a permanent fastening arrangement for such subassemblies that must be fastened to members or other subassemblies to provide secure and stable integrated structures. The inventive devices also reduce labor assembly costs and provide a convenient means for accommodating ready servicing of structures that are held together with the captive fastener assemblies described and claimed herein. Furthermore, captive fastener assemblies and retainer cups provided in accordance with the invention increase the safety and reliability of structures which utilize these devices since the fasteners will not unintentionally become loose or lost. Such captive fastener assemblies also increase the life span of the structures that they secure together. These results and advantages have not heretofore been achieved in the art.

These and other features of the present invention will become apparent from the following detailed description considered in conjunction with the accompanying drawings. It is to be understood, however, that the drawings are designed solely for purposes of illustration and not as a definition of the invention, for which reference should be made to the appended claims.

BRIEF DESCRIPTION OF THE DRAWINGS

In the drawings, wherein like reference numerals refer to like elements throughout the several views thereof.

DETAILED DESCRIPTION OF THE PREFERRED EMBODIMENTS

Figure 1:
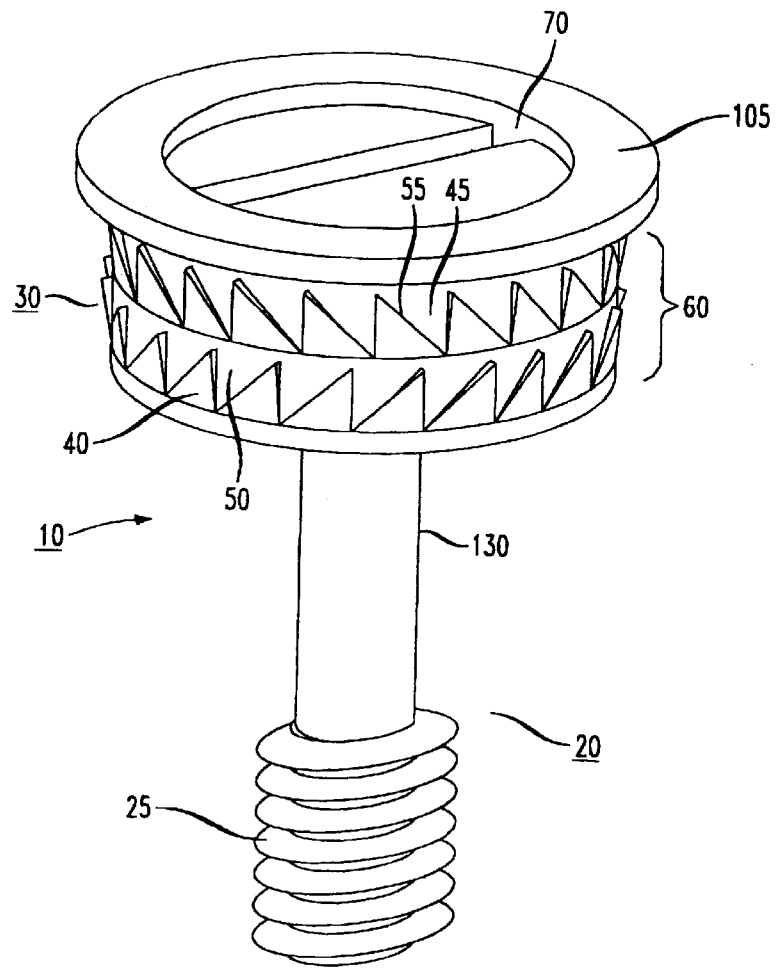
FIG. 1 is a perspective view of a captive fastener assembly in accordance with the present invention.

Referring now to FIG. 1, a preferred captive fastener assembly in accordance with the present invention is there shown and identified by the general reference numeral 10. The assembly 10 is adapted to securely grasp subassemblies that are made at least in part of soft, ductile materials so that the subassemblies can connect to and form an integrated working structure with other members such as other subassemblies, parts, and components of the structure such as a shelf or frame, for example. A fastener 20 of the assembly 10 may, by way of illustrative example, take the form of a screw, tack, nail or any other optionally elongated and/or conventional fastener which has heretofore been utilized in the art, for use in accordance with the invention for securing subassemblies formed at least in part of soft, ductile materials or, indeed, members or components formed of materials of a wide range of properties. As used interchangeably herein the terms "soft", "ductile", and "soft, ductile" are intended to denote any material that can be welded by sonic or heat energy to the captive fastener assembly and which (as a result, or in the process, of such welding) will sufficiently soften or deform or flow in a gelatinous or semi-liquid or liquid-like form to grasp the captive fastener assembly 10 and retainably or permanently secure it to the subassembly. For example, in circuit packs, which are particularly amenable to the use of captive fastener assemblies of the present invention, the printed wiring boards comprise a fiber-reinforced material that is somewhat soft and ductile. The circuit packs also comprise faceplates joined to the printed wiring boards and formed of other kinds of metals, and/or of plastic materials that are flowable through welding as described above. Captive fastener assemblies as described herein are permanently and non-releasably mounted through such welding on these subassemblies as a consequence of the configuration of the fastener assemblies and subassemblies as described below. The fastener 20 shown by way of example herein includes a shaft 130 and a connecting portion or member 25 for securing fastener 20 to a structural member such as other subassemblies, parts and components of structures as mentioned above. The connecting member 25 is here shown as a set of threads so that the fastener 20 comprises a screw, but could also be a barbed point when the fastener is a tack, or a sharp end when the fastener is a nail. Other appropriate connecting members or arrangements will be readily apparent to those skilled in the art depending on the particular type of fastener 20 that is to be used in the inventive assemblies.

Preferably, the inventive captive fastener assembly 10 comprises an undercut retainer cup 30 which is adapted to engage the soft, ductile material of the subassembly to non-releasably retain the captive fastener assembly 10 to the ductile material of the subassembly through welding of the ductile material to the retainer cup 30 of the captive fastener assembly. The retainer cup 30 includes a set of undercuts 40 for direct engagement with the soft, ductile material of the subassembly. The undercuts 40 can assume any configuration appropriate or suitable for grasping the soft, ductile material of the subassembly and which are effective to seat and solidly secure the retainer cup to the subassembly in such fashion as to prevent the captive fastener from loosening or separating from the subassembly in response to stresses placed thereon when structures including the subassemblies are secured together by the fasteners 20. The undercuts may by way of example comprise a set or plurality of projecting teeth, barbs, ridges or knurls to accomplish this goal. The undercuts may be placed randomly on or about the peripheral outer or exterior sidewall surface of the retainer cup, or may be defined in a pattern on or about the retainer cup's exterior sidewall surface for optimum grasping of the ductile material of the subassembly.

More preferably, and as shown in the drawings, the undercuts each comprise a section 45 that is relatively depressed into the retainer cup's sidewall, or impact cut therein, and a relatively raised or projecting rib or tooth-like portion 55 that has a sharp edge having a direction or orientation that will catch the ductile material of the subassembly when the captive fastener assembly is engaged therewith as by sonic or heat-induced welding of the ductile material. In a further preferred arrangement, the undercuts are disposed in two circumferential rows on or about the external periphery of the retainer cup 30 with the sharp tooth-like portions 55 of one of the rows oriented in the opposite direction to the sharp tooth-like portions 55 of the other row. This configuration is particularly effective for preventing the retainer cup 30 of the captive fastener assembly 10 from pulling out of or away from, the ductile material of the subassembly when externally applied stress is placed on the subassembly.

Figure 2:
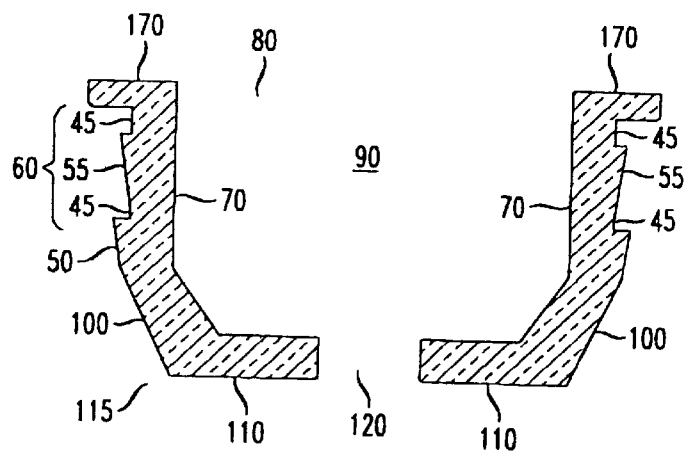
FIG. 2 is a cross-sectional side view of a retainer cup for use with a captive fastener in accordance with the present invention.

Referring now to both FIGS. 1 and 2, the retainer cup 30 further comprises a substantially cylindrical base section 50 having a cylindrical height, shown generally at 60, and including a sidewall 70. The inner surface of sidewall 70 defines an opening or open end 80 at the top of retainer cup 30 and bounds a cavity 90. The outer surface of sidewall 70 carries or defines the raised tooth-like ribs 55 that project radially outward therefrom and adjacent interstitial depressions 45 into which the ductile material of the subassembly will flow when the captive fastener assembly 10 is welded thereto. When such welding is carried out, the ductile material of the subassembly will flow to substantially fill the interstitial depressions 45, thereby non-releasably securing the retainer cup 30 to the ductile material of the subassembly.

Figure 3:
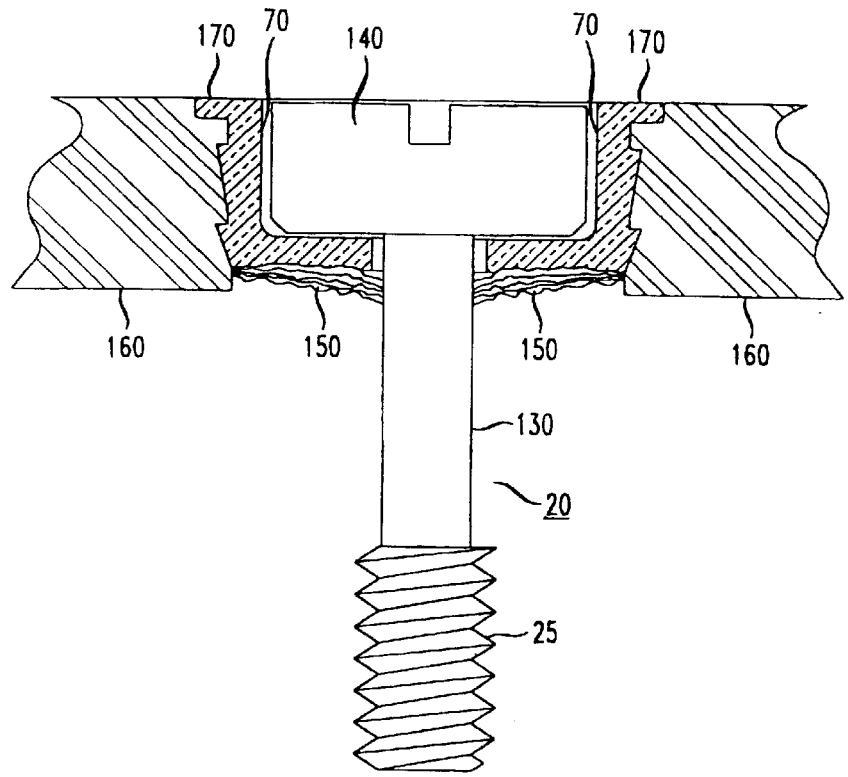
FIG. 3 is a side view, partially in cross-section, of the captive fastener assembly of FIG. 1 in operative engagement with a subassembly.

Referring now to FIGS. 2 and 3, in one form of the inventive retainer cup 30 sidewall 70 further extends downward at an inward slope from the bottom of cylindrical base section 50 to form a sloped flap 100. Sloped flap 100 further projects at its distal end in a radially inward direction substantially perpendicular to the axis of the cylindrical base section 50 to form a radial projection 110. Radial projection 110 terminates at a throughbore 120 centrally formed in the retainer cup for receiving shaft 130 of fastener member 20 in loosely journalled relation therethrough. The sloped flap 100 and radial projection 110 together form a conical section or button 115 which may be further crimped or deformed upward to captively secure the fastener 20 in the retainer cup cavity 90. The shaft 130 of fastener 20 is journalled in the throughbore 120, and a radially enlarged fastener head 140 on or proximate an upper end of the shaft 130 is capture in cavity 90 by the relatively smaller diameter or size of the opening in the button 115, formed for example when the conical button 115 is deformed, crimped or swaged around shaft 130 below fastener head 140, as is shown in FIG. 3.

The deformed, crimped or swaged material 150 of sloped flap 100 and radial projection 110 securely holds the shaft 130 in place and captures the fastener head 140 in cavity 90, while connecting member 25, which is carried at or proximate the opposite end on shaft 130 from head 140, is located outside of cavity 90 so that the connecting member can selectively connect to another structural member to secure such structural member to subassembly 160.

During a preferred manufacturing process of the captive fastener assemblies of the present invention, the fastener 20 is placed in the retainer cup cavity 90 and, where the retainer cup 30 is formed as a relatively thin metal body, pressure is applied to the conical button 115 which crimps, deforms, or crushes it toward or against the fastener head 140 and shaft 130 to captively retain the enlarged head of fastener 20 in the retainer cup 30. Where the retainer cup 130, is alternatively formed of a plastic material, the conical button 115 can either be crimped, deformed, or crushed toward or against the fastener head 140 and shaft 130, or first softened by sonic or heat welding and then deformed toward or against fastener head 140 and shaft portion 130, to captively retain the head of fastener 20 in retainer cup 30.

A flange 170 extends radially outwardly from the upper surface or lip of cylindrical base section 50 and prevents pull through of retaining cup 30 in subassembly 160 as or after fastener 20 is tightened or otherwise secured to the structural member to which the subassembly will be secured and after the retainer cup 30 is welded to subassembly 160. The flange 170 also protects the ductile material of the subassembly 160 during and after fastener 20 is manipulated to secure the subassembly to the structural member. As can be seen, by this arrangement the fastener 20 contacts only the inner surface of sidewall 70 and thereby prevents damage to the soft, ductile material of subassembly 160 when the retainer cup 30 is welded thereto.

Referring now collectively to FIGS. 1, 2 and 3, in the therein depicted embodiment the undercuts 40 are formed on the peripherally exterior surface of cylindrical base section 50 for engagement with the soft, ductile material of subassembly 160 which may, for example, be a circuit pack. It will be recognized by those skilled in the art that the subassembly 160 may be formed in its entirety or in part of such soft, ductile materials. In any event, in use the retainer cup 30 is welded to the soft, ductile material of the subassembly 160 by conventional sonic or heat welding techniques, or by any other procedure by which the ductile material is sufficiently softened to flow or creep or seep into and about the irregular interstices of the retainer cup's periphery so as to form a non-releasable engagement of the retainer cup with the ductile material. The retainer cup 30 may be fashioned from a metal material such as stainless steel or brass and, in such cases, the material should preferably be chosen for its non-corrosive properties. When retainer cup 30 is formed from such metals, the undercuts 40 will engage the soft, ductile material of the subassembly which will, in the welding process, flow around and about the metal undercuts 40 to define the engaging connection therebetween.

Alternatively, the retainer cups may be fabricated of plastic materials, optionally of a type that are similarly flowable when welding techniques are applied to the ductile material of the subassembly 160. In this case the flowable material of subassembly 160 and the flowable material of retainer cup 30 may flow together during welding, thereby producing a particularly strong, substantially unbreakable mechanical and chemical weld effective to prevent the captive fastener assembly 10 from pulling out or away from subassembly 160. The retainer cup 30 may for example be fabricated from commodity plastic resins such as polypropylenes, polystyrenes, polycarbonates and polyetherimides. These materials may in some instances have a higher melt point than the ductile materials of the subassemblies and may not therefore flow during the welding process at all, in which case a strict mechanical bond will be formed between the ductile material of the subassembly and the plastic material of the retainer cup 30. The retainer cup 30 may also be fabricated from engineering plastic resins such as polyesters.

Where such plastic resins are used, the retainer cup 30 may alternatively be insert molded by spraying the plastic material around the fastener 20, thus eliminating the need for a crimp button 115, or post molded as described above wherein the fastener 20 is welded to the retainer cup 30 and the crimp button 115 is deformed to captively secure the fastener 20 to the retainer cup after the cup is in place on the ductile material of subassembly 160. The fastener 20 may advantageously also be formed of plastic so that the entire captive fastener assembly 10 can be reground, and the material comprising the captive fastener assembly reused, in the event that it is desired to reclaim the captive fastener assembly 10 from a subassembly no longer in use.

Figure 4:
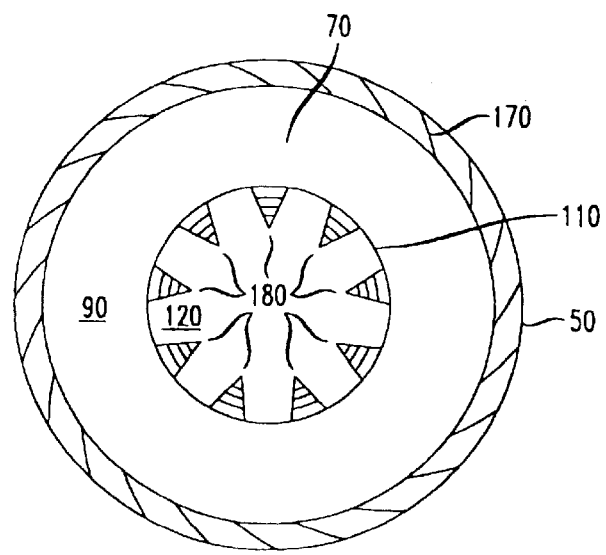
FIG. 4 is a top plan view of an alternative embodiment of a retainer cup of the present invention.

Referring now to FIG. 4, an alternative embodiment of a retainer cup 30 includes a plurality of radially extending barbs or fingers 180 that are formed at substantially even intervals circumferentially about radial projection 110. The fingers 180 extend radially inwardly and partially across throughbore 120 and are adapted to catch or cinch against shaft 130 when the fastener 20 is journalled through the resulting opening and the fastener head is captured in the cavity 90. The barbs or fingers may replace the conical button 115 formed from flap 100 and radial projection 110, so that sloped flap 100 is eliminated and radial projection 10 begins at the bottom of cylindrical base section 50, or may optionally be used in conjunction with the conical crimp button to aid in captively securing the head of fastener 20 in retainer cup 30. In any event, when shaft 130 is translated through throughbore 120, the fingers 180 will deform in the direction of movement of shaft 130 and cinch thereto. The fastener 20 will remain secured to retainer cup 30 since the fingers 180 will not allow the shaft to be retracted from throughbore 180 but only allow the shaft to further advance into the structural member to which subassembly 160 is being secured.

The retainer cups and captive fastener assemblies of the invention, as described and claimed herein, advantageously provide a construction and arrangement by which the inventive assembly is non-releasably engageable with a ductile portion of a part or subassembly that is to be joined to or engaged with another device or element or subassembly, generally in a secure and reliable manner. The inventive captive fasteners also reduce labor assembly costs and provide a convenient means for servicing structures that are held together by the fastener assemblies. Furthermore, captive fastener assemblies and retaining cups provided in accordance with the present invention increase the safety and integral stability of structures that utilize these devices since the fasteners will not unexpectedly become loose or lost, and also increase the life-span of the integrated structures that are secured together with the inventive assembly. Such results have not heretofore been achieved in the art.

While there has been shown and described certain fundamental novel features of the present invention as applied to preferred embodiments thereof, it will be understood by those skilled in the art that various omissions and substitutions and changes in the devices and methods described herein, and in their operation, may be made by those with skill in the art without departing from the spirit and scope of the invention. It is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale, but are merely conceptual in nature. It is the intention, therefore, to be limited only as indicated by the scope of the claims appended hereto.

What is claimed is:

1. A captive fastener assembly for non-releasable securement to a subassembly comprising a ductile material, and operable for connecting the subassembly to a structural member to form an integrated structure of the subassembly and member, said captive fastener comprising:

a retainer cup configured for non-releasable welded engagement with the ductile material of the subassembly, said retainer cup comprising a side wall and a base defining a cavity open at an end of the cavity opposite said base, and a throughbore defined in and through said base, said side wall comprising a plurality of projections extending radially outward from the side wall and configured to define a plurality of projecting edges and adjacent interstices into which the ductile material of the subassembly is flowable through welding to form an interface between the projections and ductile material at which the ductile material substantially fills said interstices to define a non-releasable connection of the retainer cup to the ductile material of the subassembly; and an elongated fastener comprising a shaft, a radially-enlarged head proximate one end of the shaft, and means for connecting the fastener to the structural member proximate an opposite end of the shaft remote from said one end, said fastener being journalled through said retainer cup throughbore so that said head is disposed captively within said retainer cup cavity and said connecting means is located outside of said cavity for selective connection with the structural member to connect, through said elongated fastener, the subassembly and the structural member and thereby form an integrated structure of the subassembly and member, wherein the retainer cup further comprises a crimp button formed on a bottom portion of the retainer cup for securing the fastener at the fastener head in the retainer cup.

2. The captive fastener assembly recited in claim 1, further comprising an outwardly extending flange formed at an upper end of the retainer cup sidewall.

3. The captive fastener assembly recited in claim 1, wherein said plural projections comprise a set of knurls.

4. The captive fastener assembly recited in claim 1, wherein said plural projections comprise a set of ridges.

5. The captive fastener assembly recited in claim 4, wherein each of said ridges comprises a depression in the retainer cup and a raised rib portion above the depression with a sharp edge for engagement with the ductile material of the subassembly to facilitate said non-releasable connection between the retainer cup and the ductile material.

6. The captive fastener recited in claim 1, wherein the retainer cup comprises a plastic resin.

7. The captive fastener recited in claim 2, wherein the fastener comprises a screw.

* * * * *